United States Patent
Kumar (10) Patent No.: US 11,693,822 B2
(45) Date of Patent: Jul. 4, 2023

(54) WORKER THREAD PROCESSING

(71) Applicant: SAP SE, Walldorf (DE)

(72) Inventor: Viren Kumar, Vancouver (CA)

(73) Assignee: SAP SE, Walldorf (DE)

( * ) Notice: Subject to any disclaimer, the term of this patent is extended or adjusted under 35 U.S.C. 154(b) by 709 days.

(21) Appl. No.: 15/645,093

(22) Filed: Jul. 10, 2017

(65) Prior Publication Data

US 2018/0336214 A1 Nov. 22, 2018

Related U.S. Application Data (60) Provisional application No. 62/506,762, filed on May 16, 2017.

(51) Int. Cl.
*G06F 16/14* (2019.01)
*G06F 16/248* (2019.01)
*G06F 16/26* (2019.01)

(52) U.S. Cl.
CPC .......... *G06F 16/156* (2019.01); *G06F 16/148* (2019.01); *G06F 16/248* (2019.01); *G06F 16/26* (2019.01)

(58) Field of Classification Search
CPC ............................... G06F 16/156; G06F 16/26
See application file for complete search history.

(56) References Cited

U.S. PATENT DOCUMENTS

| | | | | |
|---|---|---|---|---|
| 2005/0086359 A1* | 4/2005 | Banerjee | ............... | G06F 9/5027 709/232 |
| 2010/0185961 A1* | 7/2010 | Fisher | ................... | G06F 11/324 715/760 |
| 2010/0211895 A1 | 8/2010 | Mistry et al. | | |
| 2010/0251240 A1* | 9/2010 | Matesan | ............. | H04L 67/1095 718/100 |
| 2010/0306275 A1* | 12/2010 | Maheshwari | ....... | G06F 11/0709 707/803 |
| 2013/0042190 A1* | 2/2013 | Ciloci | .................... | G06Q 10/10 715/764 |
| 2013/0173652 A1* | 7/2013 | Woods | .................. | G06Q 40/00 707/769 |
| 2014/0089297 A1* | 3/2014 | Cardno | ................. | G06F 16/532 707/722 |
| 2017/0154088 A1* | 6/2017 | Sherman | ............. | G06F 9/45558 |

OTHER PUBLICATIONS

"Communication: European Extended Search Report", dated Apr. 30, 2018 (dated Apr. 30, 2018), European Patent Office, European Application No. 17002046.5-1217, 7pgs.

* cited by examiner

*Primary Examiner* — Mohamed Abou El Seoud
*Assistant Examiner* — J Mitchell Curran
(74) *Attorney, Agent, or Firm* — Buckley, Maschoff & Talwalkar LLC (57) ABSTRACT

A system includes reception of a request to display a first dashboard, transmission of a request for a first dashboard data file associated with the first dashboard from a server system, reception of the first dashboard data file associated with the first dashboard from the server system, issuance a first plurality of queries of the first dashboard data file to the server system, reception of result sets in response to the first plurality of queries, building of results based on the result sets and the model data, rendering of one or more data visualizations based on the results, and presentation of the one or more data visualizations on the display.

18 Claims, 6 Drawing Sheets

WORKER THREAD PROCESSING

CROSS-REFERENCE TO RELATED APPLICATIONS

This application is related to, and claims benefit of and priority to, U.S. Provisional Patent Application No. 62/506,762, filed May 16, 2017, the contents of which are hereby incorporated by reference in their entirety for all purposes.

BACKGROUND

Enterprise software systems receive, generate, and store data related to many aspects of an enterprise. Users operate reporting tools to access such data and display the data in useful formats, such as in graphic visualizations. Conventionally, in response to a user request for a visualization, a reporting tool fetches a definition of the visualization and model data on which the visualization is based from a backend data source. The reporting tool builds and issues appropriate queries based on the definition and model data, receives query results and builds a result set therefrom, and renders the visualization based on the result set. Performance improvements to this process are desired.

DETAILED DESCRIPTION

The following description is provided to enable any person in the art to make and use the described embodiments. Various modifications, however, will remain readily-apparent to those in the art.

Generally, some embodiments provide improved response times by persisting queries and model data in association with visualization definitions at a backend data source. Such persistence may reduce the need to fetch model data separately from the visualization definitions or to build queries based thereon each time a data visualization is requested. Moreover, some embodiments allow one execution thread to render a story page while another execution thread issues queries and builds results based on the model data and visualization definitions.

Figure 1:
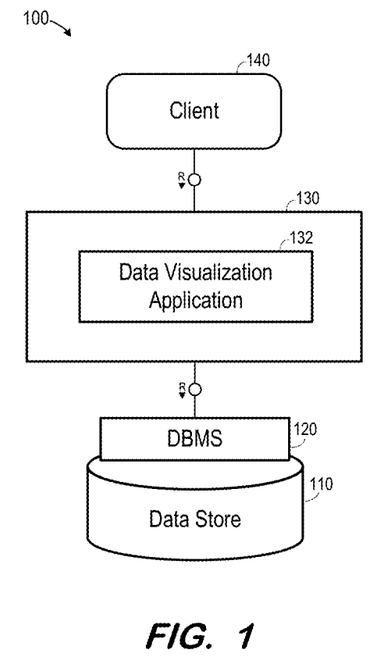
FIG. 1 is a block diagram of a system architecture according to some embodiments.

FIG. 1 is a block diagram of system 100 according to some embodiments. Embodiments are not limited to the FIG. 1 system. System 100 includes data store 110, database management system (DBMS) 120, server 130, and clients 140. Server 130 may execute data visualization application 132 to provide visualizations of data stored in data store 110 according to some embodiments. Server 130 may also receive requests from client 140 and provide the data visualizations thereto in response. The data visualizations may be provided in a format (e.g., JavaScript Object Notation (JSON)) which may be rendered by applications executed by client 140 (e.g., a Java Execution Engine executing within a Web Browser on client 140).

According to some embodiments, client 140 executes a Web browser to present a user interface to a user on a display of client 140. The user enters a query into the user interface, and client 140 passes a request based on the query to server 130. Server 130 generates an SQL script based on the request, and forwards the SQL script to DBMS 120. DBMS 120 executes the SQL script to return a result set to server 130 based on data of data store 110, data visualization application 132 generates a data visualization based on the result set, and client 140 renders the data visualization. According to some embodiments, client 140 receives the result set and generates and renders a data visualization based thereon.

The query may leverage a semantic layer defining a set of objects. The semantic layer may be defined by metadata stored within data store 110 and/or a separate repository (not shown). Each object associates one or more physical entities (e.g., a physical database table, associated columns of one or more database tables, etc.) of data store 110 with user-friendly names. These objects may be classified as dimensions, along which one may perform an analysis or report (e.g., Year, Country, Product), or measures (e.g., Sales, Profit), whose values can be determined for a given combination of dimension values (e.g., 2006, U.S.A., Televisions). Accordingly, a user-generated query may include thusly-defined dimensions, dimension values and/or measures, and the metadata is used to execute the query with respect to the corresponding physical entities of data store 110. The query may also include other information such as filters.

Data store 110 may comprise any data sources which are or become known, including but not limited to database views, spreadsheets, relational databases and/or OnLine Analytical Processing cubes. Data store 110 may also comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

System 100 may be located on-premise according to some embodiments. According to other embodiments, server 130, DBMS 120 and data store 110 are located off-site (e.g., in the Cloud).

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of applications completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Presentation of a user interface as described herein may comprise any system to render visualizations. For example, a client 140 may execute a Web Browser to request and receive a Web page (e.g., in HTML format) from application server 130 via HTTP, HTTPS, and/or Web Socket, and may render and present the Web page according to known protocols. In another example, an application may comprise a user interface component and an engine component. The user interface component transmits JavaScript calls to the engine component in response to user interactions and the engine component transmits corresponding HTTP calls to server 130. The engine component receives XML, HTML and/or JavaScript from server 130 in response, and provides corresponding HTML and custom style sheet (CSS) data to the user interface component for rendering thereby. Such an implementation may allow data exchange and presentation without requiring full page reloads.

Figure 2:
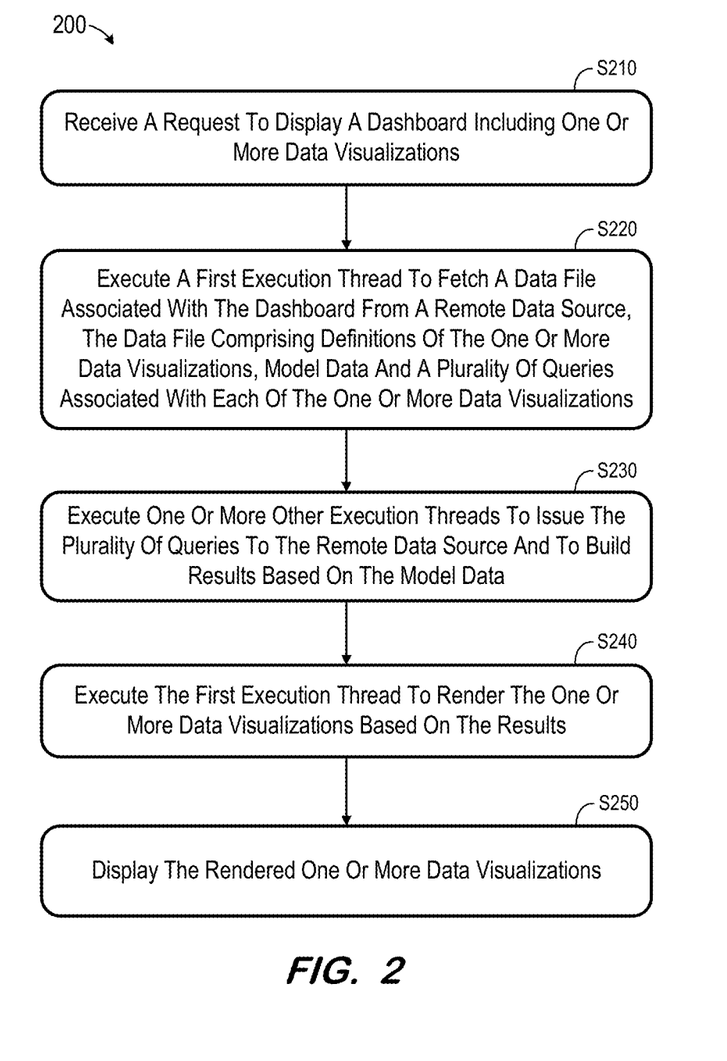
FIG. 2 is a flow diagram of a process according to some embodiments.

FIG. 2 comprises a flow diagram of process 200 according to some embodiments. In some embodiments, various hardware elements of system 100 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, a request to display a dashboard including one or more data visualizations is received. The request may be received from a user operating a user interface presented by a Web browser executing on a client system (e.g., a desktop computer, a tablet computer, a mobile phone). More particularly, the user interface may be presented as a result of execution of a Web application by an execution engine of a Web browser.

As used herein, a dashboard comprises an interface including one or more data visualizations (e.g., charts, maps, and tables, graphs). A dashboard may include additional formatting details, including but not limited to images, shapes, and text. Various elements of a dashboard may be repositioned, resized, or removed. A dashboard may consist of several pages, each of which includes an interface as described above.

The elements of a dashboard may be thematically related in order to illustrate or identify logic behind the data presented in the visualizations of the dashboard. In this regard, a dashboard may also be referred to as a story.

Figure 3:
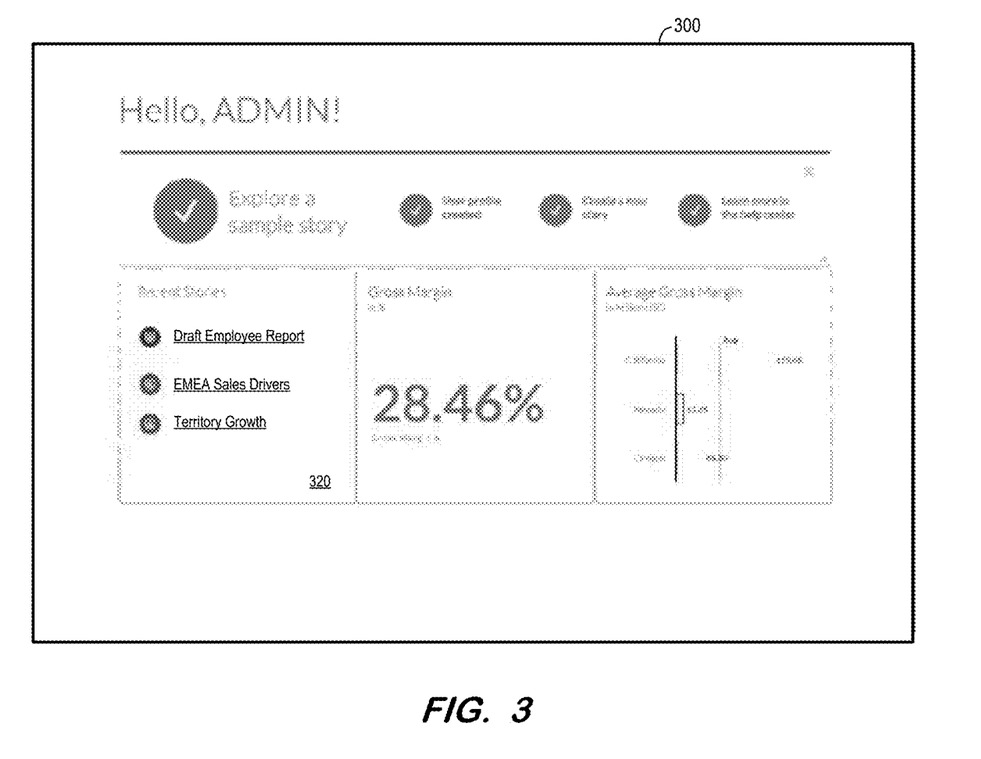
FIG. 3 is an outward view of a displayed user interface to select a set of data visualizations according to some embodiments.

FIG. 3 illustrates interface 300 to receive a request from a user to display a dashboard according to some embodiments. Embodiments are not limited to interface 300. Interface 300 may comprise a Web page provided by server 130 in response to a request from a Web browser application executing on client 140. Any client application may be used to display interface 300, which is not limited to Web-based formats.

Interface 300 includes recent stories area 320 including links associated with saved dashboards. It will be assumed that such a link is selected at S210. Next, at S220, a first execution thread is executed to fetch a data file associated with the dashboard from a remote data source.

Figure 4:
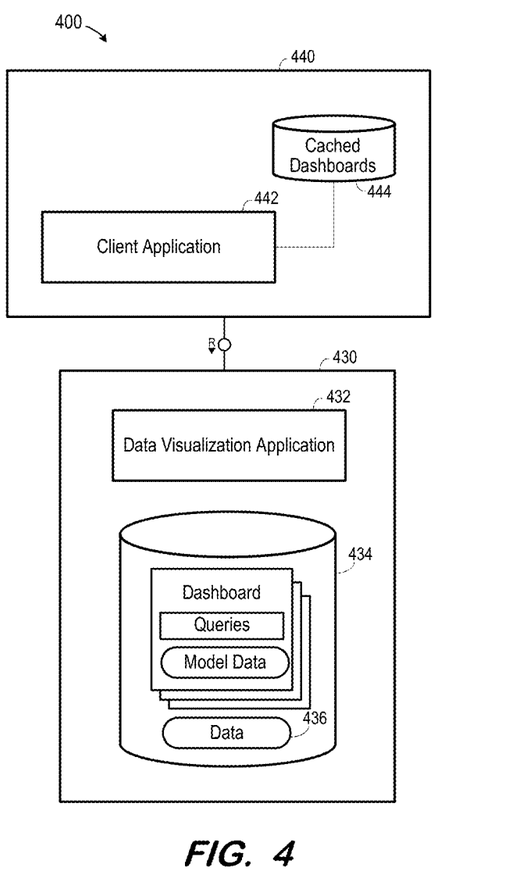
FIG. 4 is a block diagram of a system architecture according to some embodiments.

FIG. 4 illustrates system 400 to illustrate process 200 according to some embodiments. As shown, client application 442 is executed by client system 440 and receives the request to display a dashboard at S210. As is known in the art, the data visualizations of the requested dashboard are based on measures, dimensions and filters. The measures and dimensions are defined by model data which defines the structure of data 436 as is known in the art. Model data may also define hierarchies, units and currencies, and formulas associated with the measures and dimensions.

Server 430 includes data visualization application 432 and storage system 434. Storage system 434 stores several dashboards, each of which includes definitions of one or more associated data visualizations. As shown, each dashboard also includes model data and queries associated with its data visualizations. The queries included in a dashboard are those queries which are to be issued and executed to populate the data visualizations of the dashboard. The model data defines the model of dimensions, measures, etc. against which those queries are to be run, and based on which result sets of the queries may be interpreted.

Accordingly, fetching a data file associated with the requested dashboard at S220 comprises fetching a data file including definitions of the one or more data visualizations of the dashboard, the model data associated with the dashboard, and the plurality of queries associated with each of the one or more data visualizations. The fetched data file may be serialized (e.g., into JavaScript Object Notation) according to some embodiments. An example of such a data file, according to some embodiments, is provided below in Appendix A. In the example, the persisted model data is underlined and the associated queries are in italics.

The first execution thread which fetches the data file may be a main thread of an execution engine of client application 442 (e.g., a Java Execution Engine of a Web browser). Returning to process 200, one or more other execution threads may be executed at S230 to issue the plurality of queries of the fetched data file. The one or more threads may comprise worker threads, and may issue the queries while the main thread renders elements of the dashboard for display to the user. Also at S230, the one or more other threads build results based on the returned query results and the fetched model data as is known in the art.

Figure 5:
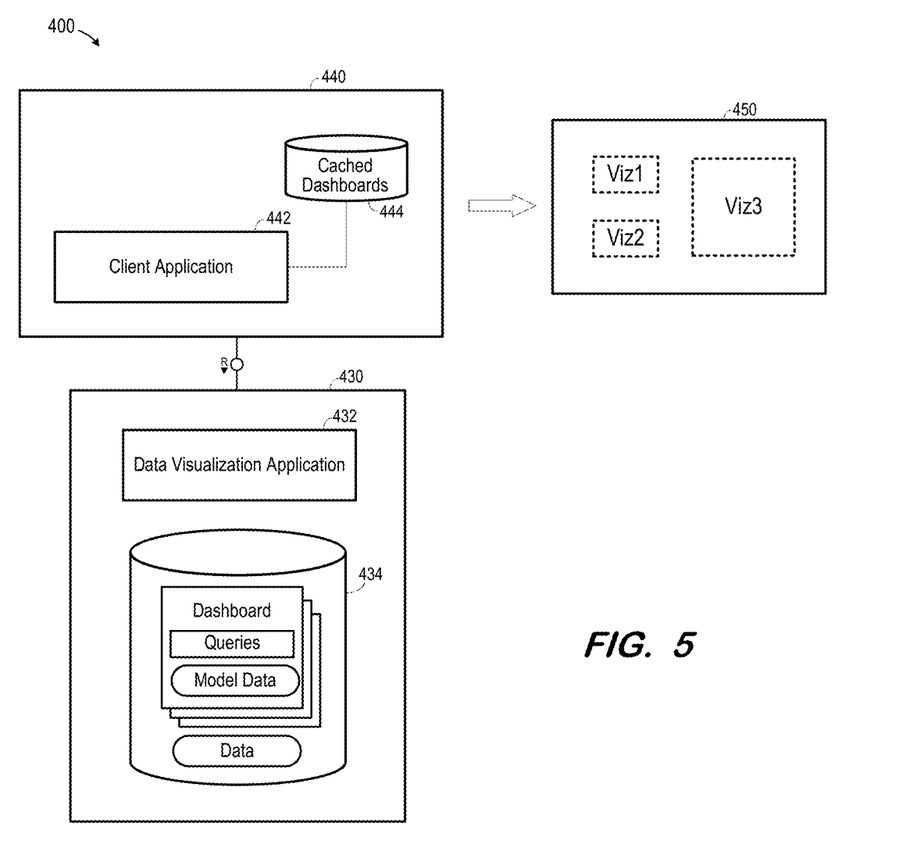
FIG. 5 is a block diagram of a system architecture according to some embodiments.

The first execution thread is executed at S240 to render the one or more data visualizations based on the result. At S250, the rendered one or more data visualizations are displayed. FIG. 5 illustrates interface 450 including the rendered visualizations Viz1, Viz2 and Viz3. Interface 450 may be presented on a display device of client system 440.

According to some embodiments, the queries are issued at S230 according to a priority queue algorithm. For example, client application 442 may allow a certain number (e.g., six) of open network requests at one time. Accordingly, only six queries may be issued and outstanding (i.e., unanswered) at any one time. Therefore, the algorithm limits the number of unanswered outstanding queries to six and, once an outstanding query is answered (i.e., a response to the query is received), the response is passed to the main execution thread and another query is issued, if any queries remain to be issued. The following pseudocode illustrates an implementation of the algorithm according to some embodiments.

```
let handlePriorityQueue = function ( ) {
  for (var i = listenerQueue.length - 1; i >= 0; i--) {
    var queuedItem = listenerQueue[i];
    if (typeof queuedItem === "function") {
      // Max number of open network requests will be assumed as 6
      // If we have an open slot left in browser's network pipeline
      if (openRequests < 6) {
        // Remove from queue first to avoid infinite loop if query execution fails
        listenerQueue.splice(i, 1);
        // Issue the query to the backend
        queuedItem( );
        // Increment the outstanding request counter
        openRequests++;
      }
    } else {
      // It's not a query, it's the response from the backend, post it back to the main thread
      postMessage(queuedItem.response);
      // Decrement the outstanding request counter so another query can be fired to the backend
      openRequests--;
      // Remove the response from the priority queue
      listenerQueue.splice(i, 1);
    }
  }
};
```

Figure 6:
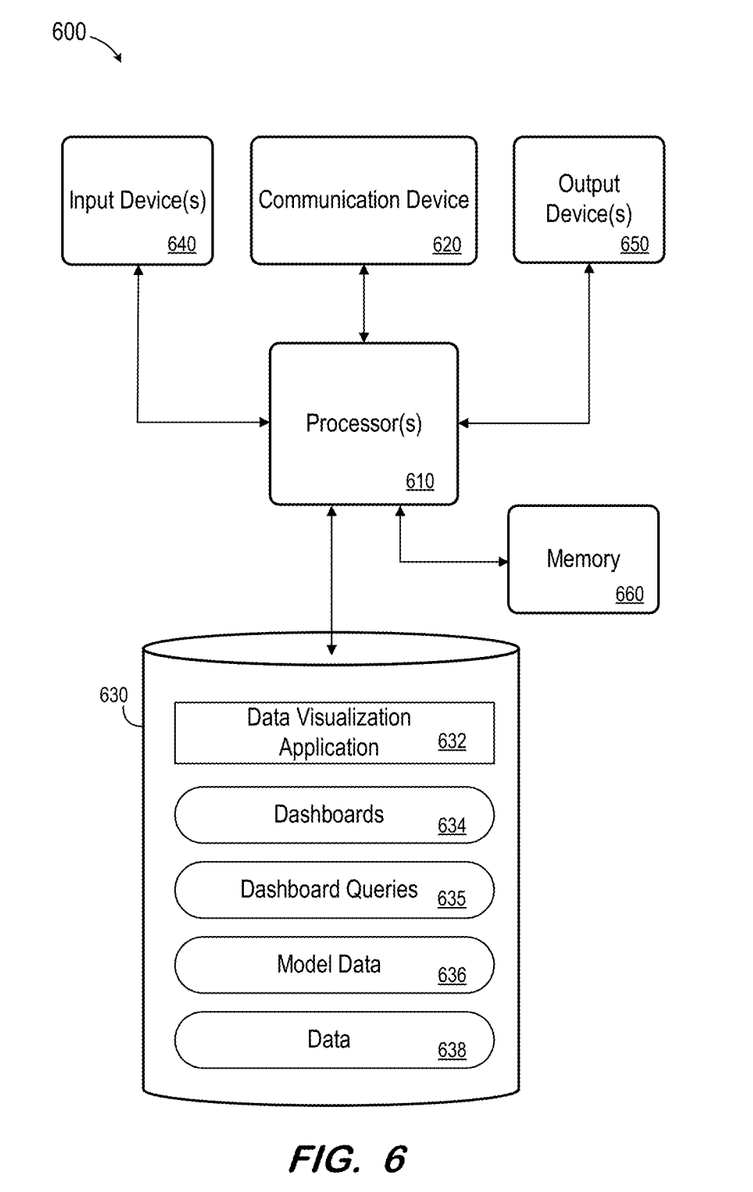
FIG. 6 is a block diagram of an apparatus according to some embodiments.

FIG. 6 is a block diagram of apparatus 600 according to some embodiments. Apparatus 600 may comprise a general-purpose computing apparatus and may execute program code to perform any of the functions described herein. Apparatus 600 may comprise an implementation of server 130, DBMS 120 and data store 110 of FIG. 1 in some embodiments. Apparatus 600 may include other unshown elements according to some embodiments.

Apparatus 600 includes processor(s) 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM), Storage Class Memory (SCM) or any other fast-access memory.

Data visualization application 632 may comprise program code executed by processor 610 to cause apparatus 600 to perform any one or more of the processes described herein. Embodiments are not limited to execution of these processes by a single apparatus.

Dashboards 634 may comprise layout, element and data visualization definitions of dashboards according to some embodiments. Dashboard queries 635, model data 636 and data 638 may be implemented as described above. Data storage device 630 may also store data and other program code for providing additional functionality and/or which are necessary for operation of apparatus 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:
1. A system comprising:
 a display;
 a memory storing processor-executable process steps; and
 a processor to execute the processor-executable process steps to:
  receive a request to display a dashboard including one or more data visualizations;
  fetch a data file associated with the dashboard from a remote data source, the data file comprising: 1. a definition, based on model data, of each of the one or more data visualizations, 2. model data defining dimensions and measures against which a plurality of queries are to be run, and 3. the plurality of queries associated with the one or more data visualizations;
  issue, via a worker thread, at least one outstanding query of the plurality of queries to the remote data source, wherein a priority queue algorithm limits a number of outstanding queries issued at a time;
  determine a response is received to the at least one outstanding query;

in response to the determination of the received response:
   transmit the received response to a main execution thread, wherein the main execution thread is different from the worker threads, and
   issue a remaining outstanding query of the plurality of queries;
build results based on responses and the model data, as the response to each outstanding query is received;
render, by the main execution thread and while the worker thread issues the outstanding queries, the one or more data visualizations based on the results; and
present the one or more data visualizations on the display.

2. A system according to claim 1, wherein the plurality of queries are issued and the results are built by one or more worker execution threads.

3. A system according to claim 2, wherein the data file is serialized.

4. A system according to claim 2, the processor to execute the processor-executable process steps to:
determine whether a number of queries which have been issued and for which a result set has not been received is equal to or less than a threshold number;
if the number of queries is less than the threshold number, execute a worker execution thread to issue a next one of the plurality of queries; and
if the number of queries is equal to the threshold number:
   determine whether a next build result has been received; and
   if it is determined that a next result set has been received, execute a worker execution thread to issue a next one of the plurality of queries.

5. A system according to claim 1, the processor to execute the processor-executable process steps to:
determine whether a number of queries which have been issued and for which a result set has not been received is equal to or less than a threshold number;
if the number of queries is less than the threshold number, issue a next one of the plurality of queries; and
if the number of queries is equal to the threshold number:
   determine whether a next build result has been received; and
   if it is determined that a next result set has been received, issue a next one of the plurality of queries.

6. A system according to claim 1, the processor to execute the processor-executable process steps to:
receive a request to display a second dashboard including a second one or more data visualizations;
fetch a second data file associated with the second dashboard from the remote data source, the second data file comprising a definition of each of the second one or more data visualizations, and second model data and a second plurality of queries associated with the second one or more data visualizations;
issue the second plurality of queries to the remote data source;
receive second result sets in response to the second plurality of queries;
build second results based on the second result sets and the second model data;
render the second one or more data visualizations based on the second results; and
present the second one or more data visualizations on the display.

7. A computer-implemented method comprising:
receiving a request to display a dashboard including one or more data visualizations;
fetching a data file associated with the dashboard from a remote data source, the data file comprising: 1. a definition, based on model data, of each of the one or more data visualizations, 2. model data defining dimensions and measures against which a plurality of queries are to be run, and 3. the plurality of queries associated with the one or more data visualizations;
issuing, via a worker thread, at least one outstanding query of the plurality of queries to the remote data source, wherein a priority queue algorithm limits a number of outstanding queries issued at a time;
determining a response is received to the at least one outstanding query;
in response to the determination of the received response:
   transmitting the received response to a main execution thread, wherein the main execution thread is different from the worker threads, and
   issuing a remaining outstanding query of the plurality of queries;
building results based on responses and the model data, as the response to each outstanding query is received;
rendering, by the main execution thread and while the worker thread issues the outstanding queries, the one or more data visualizations based on the results; and
presenting the one or more data visualizations on the display.

8. A method according to claim 7, wherein the plurality of queries are issued and the results are built by one or more worker execution threads.

9. A method according to claim 8, wherein the data file is serialized.

10. A method according to claim 8, further comprising:
determining whether a number of queries which have been issued and for which a result set has not been received is equal to or less than a threshold number;
if the number of queries is less than the threshold number, executing a worker execution thread to issue a next one of the plurality of queries; and
if the number of queries is equal to the threshold number:
   determining whether a next build result has been received; and
   if it is determined that a next result set has been received, executing a worker execution thread to issue a next one of the plurality of queries.

11. A method according to claim 7, further comprising:
determining whether a number of queries which have been issued and for which a result set has not been received is equal to or less than a threshold number;
if the number of queries is less than the threshold number, issuing a next one of the plurality of queries; and
if the number of queries is equal to the threshold number:
   determining whether a next build result has been received; and
   if it is determined that a next result set has been received, issuing a next one of the plurality of queries.

12. A method according to claim 7, further comprising:
receiving a request to display a second dashboard including a second one or more data visualizations;
fetching a second data file associated with the second dashboard from the remote data source, the second data file comprising a definition of each of the second one or more data visualizations, and second model data and a second plurality of queries associated with the second one or more data visualizations;

issuing the second plurality of queries to the remote data source;

receiving second result sets in response to the second plurality of queries;

building second results based on the second result sets and the second model data;

rendering the second one or more data visualizations based on the second results; and presenting the second one or more data visualizations on the display.

13. A system comprising:
a server system comprising a memory system, the memory system storing a plurality of dashboard data files, each of the plurality of dashboard data files comprising: 1. a definition, based on model data, of each of one or more data visualizations, 2. model data defining dimensions and measures against which a plurality of queries are to be run, and 3. the plurality of queries associated with the one or more data visualizations; and
a client system comprising:
a display; and
a processor to control the client system to:
receive a request to display a first dashboard;
transmit a request for a first dashboard data file associated with the first dashboard from the server system;
receive the first dashboard data file associated with the first dashboard from the server system;
issue, via a worker thread, at least one outstanding query of a first plurality of queries of the first dashboard data file to the server system, wherein a priority queue algorithm limits a number of outstanding queries at a time;
determine a response is received to the at least one outstanding query;
in response to the determination of the received response:
transmit the received response to a main execution thread, wherein the main execution thread is different from the worker threads, and
issue a remaining outstanding query of the plurality of queries;
build results based on responses and model data of the first dashboard file, as the response to each outstanding query is received;
render, by the main execution thread and while the worker thread issues the outstanding queries, one or more data visualizations based on the results; and
present the one or more data visualizations on the display.

14. A system according to claim 13, wherein the first plurality of queries are issued and the results are built by one or more worker execution threads.

15. A system according to claim 14, wherein the data file is serialized.

16. A system according to claim 14, the processor further to:
determine whether a number of queries which have been issued and for which a result set has not been received is equal to or less than a threshold number;
if the number of queries is less than the threshold number, execute a worker execution thread to issue a next one of the plurality of queries; and
if the number of queries is equal to the threshold number:
determine whether a next build result has been received; and
if it is determined that a next result set has been received, execute a worker execution thread to issue a next one of the plurality of queries.

17. A system according to claim 13, the processor further to:
determine whether a number of queries which have been issued and for which a result set has not been received is equal to or less than a threshold number;
if the number of queries is less than the threshold number, issue a next one of the plurality of queries; and
if the number of queries is equal to the threshold number:
determine whether a next build result has been received; and
if it is determined that a next result set has been received, issue a next one of the plurality of queries.

18. A system according to claim 13, the processor further to:
receive a request to display a second dashboard;
transmit a request for a second dashboard data file associated with the second dashboard from the server system;
receive the second dashboard data file associated with the second dashboard from the server system;
issue a second plurality of queries of the second dashboard data file to the server system;
receive second result sets in response to the second plurality of queries;
build second results based on the second result sets and model data of the second dashboard file;
render a second one or more data visualizations based on the second results; and
present the second one or more data visualizations on the display.

* * * * *